United States Patent [19]

Esneault et al.

[11] Patent Number: 4,707,521

[45] Date of Patent: Nov. 17, 1987

[54] PROCESS FOR METALLATING CRYSTALLINE ETHYLENE-NONCONJUGATED DIENE POLYMERS AND GRAFT POLYMERS PREPARED THEREFROM

[75] Inventors: Calvin P. Esneault, Baton Rouge, La.; Gary K. Lund, Ogden, Utah

[73] Assignee: The Dow Chemical Company, Midland, Mich.

[21] Appl. No.: 839,301

[22] Filed: Mar. 12, 1986

[51] Int. Cl.$^4$ .............................................. C08F 8/42
[52] U.S. Cl. ................................ 525/250; 525/331.7; 525/366
[58] Field of Search ...................... 525/366, 331.7, 250

[56] References Cited

U.S. PATENT DOCUMENTS

| | | | |
|---|---|---|---|
| 3,435,096 | 3/1969 | Lombert et al. | 260/878 |
| 3,489,822 | 1/1970 | Witt et al. | 260/878 R |
| 3,492,369 | 1/1970 | Naylor | 260/879 |
| 3,598,793 | 8/1971 | Koch | 260/79.5 B |
| 3,627,837 | 12/1971 | Webb | 260/836 |
| 3,703,566 | 11/1972 | Duck et al. | 260/878 R |
| 3,794,697 | 2/1974 | Bronstert et al. | 260/876 R |
| 3,832,423 | 8/1974 | Milkovich et al. | 260/878 R |
| 3,879,358 | 4/1975 | Lachowicz et al. | 260/80.78 |
| 3,886,233 | 5/1975 | Vissern | 260/878 R |
| 3,976,628 | 8/1976 | Halasa et al. | 526/22 |
| 4,078,019 | 3/1978 | Langer, Jr. | 260/880 R |

OTHER PUBLICATIONS

A. J. Amass et al., "Anionic Graft Copolymerization of Ethylene–Propylene Terpolymers", European Polymer Journal, vol. 8, pp. 781–787 (1972).

M. Schlosser et al., "The 'Super-Basic' Butyllithium Tert-Butoxide Mixture and Other Lickor-Reagents", Tetrahedron Letters, vol. 25, No. 7, pp. 741–744 (1984).

A. Peterlin et al., ed., "Monomers Polymerized by Anionic Initiators", Macromolecular Reviews, vol. 2, pp. 74–83 (1967).

J. McGrath, ed., Anionic Polymerization, ACS Symposium Series 166, p. 60, 1981.

Primary Examiner—Joseph L. Schofer
Assistant Examiner—Bernard Lipman
Attorney, Agent, or Firm—D. R. Howard

[57] ABSTRACT

A process is provided for metallating crystalline ethylene polymers which have polymerized therein a minor amount of at least one nonconjugated diene and, optionally, a minor amount of at least one 1-olefin. Metallation is accomplished with an alkyllithium compound and at least one activating reagent after a slurry of the copolymer in a nonreactive, saturated, nonpolar hydrocarbon solvent is first heated to a temperature greater than 80° Centigrade to provide the polymer with an expanded settling volume greater than its original settling volume. Metallation may be accomplished either at that temperature or at a lower temperature following cooling of the slurry. The activating reagents include potassium alkoxides, and chelating tertiary diamines. The metallated polymers so prepared may be reacted with (a) one or more anionically polymerizable monomers to form graft polymers or (b) a reagent such as carbon dioxide to form a functionalized polymer.

26 Claims, No Drawings

PROCESS FOR METALLATING CRYSTALLINE ETHYLENE-NONCONJUGATED DIENE POLYMERS AND GRAFT POLYMERS PREPARED THEREFROM

BACKGROUND OF THE INVENTION

The present invention concerns metallating crystalline olefin polymers which have polymerized therein a minor amount of at least one nonconjugated diene. More specifically, the present invention concerns a process for metallating crystalline, ethylene polymers having polymerized therein a minor amount of at least one nonconjugated diene monomer and, optionally, a minor amount of at least one 1-olefin monomer. The present invention also concerns graft polymers and functionalized polymers prepared from such metallated polymers.

The term "metallation", used in its broadest sense, describes a substitution reaction in which a non-carbon atom is replaced by an alkali metal atom. In a narrower sense, it is believed that metallation of unsaturated polymers occurs by allyl hydrogen exchange whereby an anion is produced. The resulting anion is stabilized by delocalization with the adjacent double bond. The alkali metal atom is suitably provided by an organo-alkali metal compound such as an alkyllithium compound.

Metallation of conjugated diene polymers with an organolithium compound, such as n-butyllithium, in combination with either a tertiary diamine, such as, tetramethylethylenediamine (hereinafter "TMEDA'-")or a potassium alkoxide, such as potassium-tert-butoxide or potassium-tert-amyloxide, is known. See, e.g., A. F. Halasa et al., "Metallation of Unsaturated Polymers by Using Activated Organolithium Compounds and the Formation of Graft Polymers II", *Journal of Polymer Science*, Volume 14, pages 497–506 (1976).

E. W. Duck et al, in U.S. Pat. No. 3,703,566, disclose metallation of unsaturated hydrocarbon elastomers and formation of graft copolymers by polymerizing one or more monomers in the presence of the metallated elastomer. The elastomer has polymerized therein ethylene, a 1-olefin such as propylene, and a nonconjugated diene monomer and is more commonly known as an "EPDM terpolymer". Metallation is accomplished by admixing a solution of the terpolymer in an inert organic solvent with a complex of an alkali metal hydrocarbon, such as n-butyllithium, and a polar compound, such as a tertiary diamine or an alkali metal alkoxide.

Metallation of unsaturated hydrocarbon elastomers is commonly conducted in solution to attain enhanced levels of metallation efficiency. Care must be taken, however, in selection of the solvent. Metallation in nonpolar organic solvents, for example, leads to an undesirable rise in solution viscosity due to ionic association.

It would be desirable if olefin polymers could be metallated so as to minimize viscosity increase without sacrificing either degree of metallation or polymer solids content. This would allow for simpler agitated reactor design with reduced agitation energy requirements and for greater amounts of polymer solids per reactor volume.

It would also be desirable if there were available a process for metallating crystalline olefin polymers which are not soluble in the common organic polar solvents used to metallate hydrocarbon elastomers. Polymers fitting this description include those having polymerized therein a minor amount of nonconjugated diene monomer. One such polymer is a crystalline ethylene/nonconjugated diene polymer. Another such polymer is a crystalline ethylene/nonconjugated diene/1-olefin polymer.

SUMMARY OF THE INVENTION

In one aspect, the present invention is a process for metallating a particulate, crystalline ethylene polymer. The process comprises:

a. heating an admixture of the polymer and a nonreactive, saturated, nonpolar organic hydrocarbon solvent, the admixture having an original settling volume, to a temperature and for a period of time sufficient to provide the polymer, after being cooled to ambient temperature, with an expanded settling volume which is greater than the original settling volume;

b. adding at least one lithium alkyl compound and at least one activating reagent selected from the group consisting of tertiary diamines and potassium alkoxides to the cooled admixture.

In a related aspect, the process further comprises an intermediate step of cooling the heated admixture to a temperature suitable for metallating the polymer.

Once the desired level of metallation is attained, the metallated polymer is normally used as a reaction intermediate, either with or without recovery from the metallating reagents. The reaction intermediate may be functionalized by reaction with suitable reagents or used as an anionic polymerization initiator.

As used herein, the term "settling volume" refers to the apparent volume occupied by a particulate solid in an admixture prepared by adding said particulate solid, without agitation or compacting, to a liquid of lesser density and allowing said solid to settle. The particulate solid is an ethylene/nonconjugated diene polymer. The liquid is a nonreactive, saturated, nonpolar hydrocarbon solvent which, at room temperature, may swell or wet polymer particles without causing said particles to coalesce or go into solution. In other words, the solvent must be one which provides a slurry of polymer particles rather than a polymer solution or cement. The term "original settling volume" refers to the settling volume of the polymer in the admixture prior to heating thereof. The term "expanded settling volume" refers to the settling volume of the polymer after the admixture has been heated to an elevated temperature and then cooled to a temperature of about 25° Centigrade.

The present invention also relates to the metallated ethylene polymers so prepared.

The process of the present invention provides higher levels of metallation in crystalline polymers than were attainable by prior processes. Metallation of crystalline polymers allows certain processing latitude not available in metallating elastomeric polymers. For example, excess metallating reagents are readily removed from the crystalline polymer because of its particle integrity. Similar removal from elastomeric polymers is difficult, if not impossible, because the polymers are soluble in the solvents used for metallation. Removal of excess metallating reagents is necessary because they will compete with the metallated polymer for subsequently added monomers or reagents.

Three additional advantages flow from the ease of separating excess metallating reagents from the metallated crystalline polymer. First, the metallating reagents can be recycled. This allows the use of otherwise prohibitively expensive metallating reagents. Second, recovering the metallated polymer in the active form allows concentration thereof for further reaction. Third, the metallated polymer can be re-slurried in a solvent other than that used for metallation. The solvent used for re-slurrying may be one which is readily metallated and thus unsuitable for use in the metallation reaction. The solvent used for re-slurrying may also be one which is more conducive to polymerization of subsequently added monomers than the solvent used for metallation.

In a third aspect, the present invention is a process for preparing a graft polymer having an ethylene polymer backbone and a plurality of side chains. The process comprises (a) metallating an ethylene polymer as provided herein and (b) contacting the metallated ethylene polymer with at least one reagent selected from the group consisting of compounds having sufficient electrophilic character to react with the nucleophilic metallated polymer. If more than one reagent is used, they may be added either sequentially or simultaneously.

The present invention also relates to the graft polymers so prepared.

DESCRIPTION OF THE PREFERRED EMBODIMENTS

Ethylene polymers suitable for purposes of the present invention include crystalline copolymers of ethylene and at least one nonconjugated diene as well as crystalline interpolymers of ethylene, at least one nonconjugated diene and a minor amount of at least one 1-olefin monomer. The copolymers suitably have polymerized therein, based upon copolymer weight, from about 90 to about 99.9 percent, beneficially from about 94 to about 99 percent, ethylene and from about one-tenth to about ten percent, beneficially from about one to about six percent, nonconjugated diene. The copolymers have a density which is suitably from about 0.920 to about 0.960, beneficially from about 0.940 to about 0.960 and desirably from about 0.942 to about 0.954 grams per cubic centimeter. Suitable 1-olefin monomers include propylene, 1-butene, 1-hexene, 1-octene, 1-decene and the like. The 1-olefin monomer is desirably selected from the group consisting of 1-butene, 1-hexene and 1-octene. The amount of 1-olefin is selected to provide an interpolymer which forms a slurry, rather than a solution, when admixed with an alkane solvent at a temperature of 80° Centigrade or less. The interpolymer should also have (a) a definite melting point (as determined by differential scanning calorimetry), (b) a heat of fusion of greater than about five calories per gram and (c) a relative crystallinity of greater than about ten percent.

The ethylene polymers are readily prepared using procedures such as those described by Professor Karl Ziegler in U.S. Pat. Nos. 3,113,115 and 3,257,332. Polymerization is accomplished with a Ziegler-Natta catalyst; a cocatalyst; an inert diluent capable of dissolving ethylene, nonconjugated diene monomers and, where used, 1-olefin monomers; hydrogen; and, optionally, nitrogen. The catalyst is generally obtained by admixing a transition metal compound with an organometallic compound such as n-butyl lithium. The transition metal is selected from Groups 4b, 5b, 6b and 8 of the Periodic Table of Elements. Hydrogen is used to control polymer molecular weight. Nitrogen, or another inert gaseous element, is used to control the partial pressure of ethylene thereby adjusting the relative amount of nonconjugated diene incorporation. Polymerization is conducted at a temperature of from about 30° to about 90° C., a total pressure of from about 100 to about 200 pounds per square inch gauge (psig) (689.5 to about 1379 kilopascals), and a partial pressure of hydrogen of from about 50 to about 80 psig (344.7 to about 551.6 kilopascals). The cocatalyst is suitably a trialkylaluminum compound such as triisobutylaluminum (ATB). The inert diluent is beneficially a saturated aliphatic hydrocarbon such as hexane or heptane. Polymerization is normally terminated after a reaction time of from about one to about four hours.

Nonconjugated dienes suitable for purposes of the present invention are selected from the group consisting of straight chain diolefins, branched chain diolefins, cyclic diolefins and bicyclic diolefins. The straight or branched chain nonconjugated diolefins include those in which both double bonds are terminal as well as those in which only one double bond is terminal. The number of carbon atoms in said straight chain and branched chain diolefins is beneficially from five to about twenty, desirably from five to about ten. Illustrative straight or branched chain nonconjugated dienes include 2-methyl-1,5-hexadiene, 3,3-dimethyl-1,5-hexadiene, 1,6-heptadiene, 1,7-octadiene, 1,8-nonadiene, 1,9-decadiene, 1,19-eicosadiene and the like wherein both double bonds are terminal, as well as 1,4-hexadiene, 1,4-heptadiene, 1,5-heptadiene and the like wherein only one double bond is terminal. Similar results are obtained with cyclic nonconjugated diolefins having from about five to about twenty carbons and bicyclic nonconjugated diolefins having from about ten to about thirty carbon atoms. Cyclic diolefins include cyclohexadiene, cycloheptadiene, cyclooctadiene and the like. Bicyclic, or bridged ring, diolefins include dicyclopentadiene, ethylidene norbornene, norbornadiene and the like. The nonconjugated diene is preferably 1,4-hexadiene or ethylidene-norbornene.

Solvents suitable for use in metallating ethylene polymers include nonreactive, saturated, nonpolar hydrocarbons. The term "nonreactive", as used herein, means that the solvents do not appreciably react with the ethylene polymer, either before or after metallation thereof, or with materials used to metallate the ethylene polymer. The solvents are desirably free of moisture, air and any impurities which might react with metallation reagents. Preferred solvents are saturated hydrocarbons having from about 5 to about 10 carbon atoms, such as hexane, heptane and cyclohexane.

The tertiary diamines beneficially have three saturated aliphatic hydrocarbon groups attached to each nitrogen atom. Chelating tertiary diamines, particularly those of the formula $R'R''N-C_xH_{2x}-NR'''R''''$; cyclic diamines, such as tetralkyl 1,2-diamino cyclohexanes, tetralkyl 1,4-diamino cyclohexanes, piperazine, N,N'-dimethylpiperazine and the like; and bridgehead diamines, such as sparteine, triethylenediamine and the like, are suitable for purposes of the present invention. In the aforementioned formula, each R is independently a straight- or branched-chain alkyl group of any chain length containing up to 20 carbon atoms or more, all of which are included herein, and x is any integer from 2 to 10. The diamine is preferably an ethylene diamine in which all alkyl substituents are the same, e.g., tetramethylethylenediamine, tetraethylethylenediamine, tetradecylethylenediamine and the like.

Tertiary monoamines such as triethylamine are generally not suitable for purposes of the present invention. However, bridgehead monoamines such as 1-azo(2,2,2-)bicyclooctane and its substitued homologs, e.g., the 4-methyl and 4-ethyl substituted derivatives thereof, are quite effective.

Useful potassium alkoxides are selected from the group consisting of alkyl and aryl alkoxides having up to about 20 carbon atoms with potassium being bound to a hetero atom. Illustrative alkoxides include potassium methoxide, potassium ethoxide, potassium butoxides such as potassium-tert-butoxide, potassium phenoxide, potassium-tert-amyloxide (also known as potassium-tert-amylate), potassium-fenchylate, potassium naphthoxide and the like. The potassium alkoxide is desirably either potassium-tert-butoxide or potassium-tert-amyloxide.

The lithium alkyl compounds useful in the present invention are represented by the general formula $RLi_x$ wherein x is an integer of from 1 to 3 inclusive and R an alkyl radical containing up to 20 carbon atoms; an aromatic radical having from 6 to 20 carbon atoms; a saturated, cyclic, hydrocarbon radical having from 5 to 7 carbon atoms; a mono-unsaturated cyclic hydrocarbon radical having from 5 to 7 carbon atoms; or an unconjugated, unsaturated aliphatic radical of 1 to 20 carbon atoms. The alkyl radical may contain more than 20 carbon atoms. Such compounds, however, are expensive and unnecessary in view of the ready availability of alkyllithium compounds containing less than 20 carbon atoms. The aromatic radical is suitably selected from the group consisting of phenyl, naphthyl, tolyl, methylnaphthyl and the like. Representative compounds of the formula $RLi_x$ include methyllithium, isopropyllithium, sec-butyllithium, n-butyllithium, tert-butyllithium, n-dodecyllithium, phenyllithium, 4-phenylbutyllithium, 4-butyl-cyclohexyllithium, alpha- and beta-naphthyllithiums, any biphenyllithium, styryllithium, benzyllithium, indanyllithium, 1-lithio-3-butene, 1-lithio-cyclohexene-3, 1-lithio-cyclohexene-2, 1,4-dilithiobutane, 1,4-dilithiobenzene, 1,3,5-trilithiopentane and 1,3,5-trilithiobenzene.

Lithium adducts of polynuclear aromatic hydrocarbon, as described in U.S. Pat. No. 3,170,903, can also be used. Illustrative polynuclear aromatic compounds include biphenyl, naphthalene, anthracene and stilbene.

Branched alkyllithium compounds are believed to be more effective, in terms of metallation efficiency, than linear alkyllithium compounds having the same number of carbon atoms per alkyl moiety. The branched alkyllithium compounds may be used singly, in admixture with other branched alkyllithium compounds, or in admixture with linear alkyllithium compounds. Selection of a particular branched alkyllithium compound, or admixture thereof with other alkyllithium compounds, will depend upon factors such as cost, efficiency, availability and the like. Suitable branched alkyllithium compounds contain from five to twenty or more carbon atoms. Desirable branched alkyllithium compounds include 3,3-dimethylbutyllithium, 3,3-dimethylpentyllithium, menthyllithium and neopentyllithium.

The tertiary diamine, the potassium alkoxide and the lithium alkyl are present in amounts sufficient to provide a molar ratio of tertiary diamine to lithium atom of from about 0 to about 5 and a molar ratio of potassium atoms to lithium atoms of greater than about 0.5. In other words, while three-component metallation may be preferred, two-component metallation wherein the tertiary diamine is eliminated will produce satisfactory results. The molar ratio of potassium atoms to lithium atoms is desirably from about 0.5 to about 4.0.

In one embodiment of the present invention, metallation of particulate, crystalline ethylene polymers is accomplished in two steps. In the first step, an admixture of the polymer and a nonreactive, saturated, nonpolar hydrocarbon solvent is heated to a temperature which is greater than about 80° Centigrade. In the second step, at least one activating compound and at least one lithium alkyl compound are added to the heated admixture. If desired, the activating compound may be added to the admixture prior to heating thereof.

It has been found that the crystalline ethylene polymer particles begin to swell at temperatures of greater than about 80° Centigrade. Swelling increases as the temperature increases, at least until the temperature nears the polymer's crystalline melting point. At a temperature of about 122° Centigrade, individual particle integrity begins to disappear. The temperature at which particle integrity visually disappears will vary depending upon the polymer's crystalline melting point. Temperatures in excess of 122° Centigrade, while reachable, are of no value for metallation at or near the temperature to which the admixture is heated if reasonable metallation efficiency is desired.

It is well known that lithium alkyls, such as n-butyl lithium, undergo thermal decomposition at elevated temperatures. It is estimated that n-butyl lithium will have a half-life of 48 to 50 hours at 80° Centigrade, 7 to 8 hours at 100° Centigrade and 60 to 105 minutes at 140° Centigrade. See, K. Ziegler and H. Gellert, Ann., 567, page 179 (1950), and R. A. Finnegan and H. W. Kutta, *Journal of Organic Chemistry*, Volume 30, page 4138 (1965). In other words, at temperatures of 122° Centigrade and greater, metallation efficiency is low because the metallating agent is rapidly destroyed.

It has also been found that as swelling becomes more pronounced, a greater degree of swelling retention is observed upon cooling of the admixture. The admixture may be heated to a temperature at which particle integrity is lost, at least momentarily, provided it is thereafter agitated and cooled at a rate sufficient to reconstitute the copolymer in particulate (flakes, particles, granules, etc.) form. This procedure will work even if the crystalline ethylene polymer is initially in the form of large pieces or chunks. Rates of cooling and agitation are readily determined without undue experimentation. The reconstituted particles preferably have a settling volume greater than that of the copolymer particles or chunks before heating of the admixture.

In a related embodiment, metallation of crystalline ethylene polymers is accomplished in three steps. In a first step, an admixture of the polymer and a nonreactive, saturated, nonpolar, organic hydrocarbon solvent is heated to a temperature and for a period of time sufficient to physically swell the polymer and provide it with an expanded settling volume which is greater than its original settling volume. In the second step, the heated admixture is cooled to a temperature suitable for metallating the swollen polymer particles. The heated admixture need not be cooled to a temperature of 25° Centigrade or lower to initiate metallation. It should, however, be cooled sufficiently to preclude substantial thermal decomposition of metallating reagents. Cooling to a temperature within the range of from about 10° to about 90°, desirably from about 20° to about 70°, and preferably from about 20° to about 50° Centigrade is satisfactory. In the third step, at least one alkyllithium compound and at least one activating reagent selected from the group consisting of tertiary diamines and potassium alkoxides are added to the cooled admixture to form an intermixture. The alkyllithium compound and the activating reagent(s) can be added sequentially rather than simultaneously and in any order. In fact, the activating reagent(s) may be added to the admixture prior to heating thereof.

In another related embodiment, metallation of crystalline ethylene polymers is accomplished in three steps. In a first step, an admixture of the polymer and a nonreactive, saturated, nonpolar, organic hydrocarbon solvent is heated to a temperature and for a period of time sufficient to destroy polymer particle or chunk integrity. The temperature to which the admixture is heated is beneficially from about 100° to about 155° Centigrade. In a second step, the admixture is agitated and cooled at a rate sufficient to reconstitute the polymer in particulate form. In a third step, at least one alkyllithium compound and at least one activating reagent are added to the admixture, either simultaneously or sequentially. If desired, a step may be added between the second and third steps wherein the admixture is further cooled to a temperature suitable for metallation.

In any of the embodiments, the reaction is terminated once the desired level of metallation is attained. The metallated polymer is used as a reaction intermediate, either with or without recovery from the metallating reagents.

The admixture is desirably free of impurities which will react with metallating reagents. Small levels of impurities may be "blanked" with a lithium alkyl compound before adding the acitivating reagent(s) to the admixture to minimize reaction with the ethylene polymer's double bonds. These double bonds are, in general unaffected by lithium alkyls in the absence of other reagents.

The term "blanking", as used herein, denotes a procedure wherein a precise amount of active reagent, e.g., a lithium alkyl, is added to react with the impurities to render them chemically inactive. In a typical procedure, an aliquot of the solvent or admixture is mixed with a compound which will show a perceivable change, e.g., a color change, upon addition of the active reagent. Diphenylethylene, when added to the solvent or admixture, will color the solvent or admixture yellow when active carbanions are present. The solvent or admixture will be colorless in the absence of active carbanions. Titration of the diphenylethylene-containing solvent or admixture with a lithium compound, such as n-butyllithium, allows calculation of the precise molar amount of active reagent needed to blank out the reactive impurities.

Preparation of graft polymers suitably follows metallation of the ethylene polymer. The graft polymer is an irregular block polymer comprising a preformed ethylene polymer backbone having randomly attached thereto a plurality of pendant polymer chains. In other words, the number of pendant chains, relative position of the pendant chains with respect to the polymer backbone, and the spacing between pendant polymer chains will vary among different polymer molecules.

The irregular block polymers have a structure similar, but not identical, to conventional linear triblock or radial multiblock polymers. The pendant polymer chains have a number average molecular weight of from about 500 to about 100,000 and comprise from about 10 to about 60 percent of graft polymer weight.

The graft polymers have a variety of utilities. They can be fabricated into films, sheets and the like. They can also serve as a compatibilizer when admixed with two polymers, one similar to its ethylene polymer backbone and one similar to its pendant polymer chains. Similarly, they can be used as a tie, or adhesive, layer between dissimilar polymer layers, one fabricated from a polymer similar to the graft polymer's backbone and one fabricated from a polymer similar to the graft polymer's pendant polymer chains. Other utilities are readily apparent to those skilled in the art.

The metallated ethylene polymer is, as noted herein, in the form of a slurry of wetted particles dispersed in a solvent. If desired, the metallated polymer may be recovered from the solvent and metallating reagents and then re-slurried in a nonpolar hydrocarbon solvent. The solvent used to re-slurry the metallated polymer need not be the same as that used in metallation. It must, however, be substantially unreactive with the metallated polymer. Solvents not suitable for metallation because of their reactivity with the metallating reagents may be used to re-slurry the metallated polymer. Additional solvents include saturated aliphatic solvents and aromatic solvents.

A polar solvent which is substantially unreactive with the metallated polymer may replace part or all of the nonpolar hydrocarbon solvent. Skilled artisans recognize that reaction kinetics are affected by the presence of a polar solvent, and can readily determine an appropriate balance between polar and nonpolar solvents.

Useful polar solvents include Lewis bases such as ethers and amines. Typical Lewis bases include tetrahydrofuran, 2-methyl-tetrahydrofuran, 2,5-dimethyltetrahydrofuran, diethyl ether, triethyl phosphine, triethylamine, dimethyl ether, ethyl methyl ether, ethylene glycol dimethyl ether (glyme), diethylene glycol dimethyl ether (diglyme). The polar solvent is desirably selected from the group consisting of tetrahydrofuran, ethylene glycol dimethyl ether and diethylene glycol dimethyl ether.

Reagents used in preparing a graft polymer are selected from the group consisting of carbon dioxide, silicon halides, and anionically polymerizable monomers. Anionically polymerizable monomers having sufficient electrophilic character include, but are not limited to, vinyl aromatic compounds such as styrene, alphamethylstyrene, vinyl toluene and its isomers; vinyl unsaturated amides such as acrylamide, methacrylamide; N,N-di-(lower alkyl) acrylamides, e.g., N,N-dimethylacrylamide; acenaphthalene; 9-acrylcarbazole; acrylonitrile and methacrylonitrile; organic isocyanates including lower alkyl, phenyl, lower alkyl phenyl and halophenyl isocyanates; organic diisocyanates including lower alkylene, phenylene and tolylene diisocyanates; lower alkyl acrylates and methacrylates, including methyl, t-butyl acrylates and methacrylates; lower olefins, such as ethylene, propylene, butylene, isobutylene, pentene, hexene, etc.; vinyl esters of aliphatic carboxylic acids such as vinyl acetate, vinyl propionate, vinyl octoate, vinyl aleate, vinyl stearate, vinyl benzoate; vinyl lower alkyl ethers; vinyl pyridines; vinyl pyrrolidones; dienes including isoprene and butadiene; ketones; aldehydes; and lower alkylene oxides. The term "lower" is used above to denote organic groups containing eight or fewer carbon atoms.

Other anionically polymerizable monomers are disclosed in *Macromolecular Reviews*, Volume 2, pages 74–83, Interscience Publishers, Inc. (1967), entitled "Monomers Polymerized by Anionic Initiators". Still other monomers are disclosed in *Anionic Polymerization*, ACS Symposium Series 166, page 60, American Chemical Society (1981). The teachings of these references are incorporated herein by reference thereto. The additional monomers include vinylnaphthalenes, alkyl methacrylates wherein the alkyl group has up to eighteen carbon atoms, lactones and thiiranes. Monomers suitable for purposes of the present invention, but not disclosed in either publication, include lactams such as caprolactam.

The anionically polymerizable monomer is desirably selected from the group consisting of styrene, alphamethylstyrene, alkyl acrylates having from one to eight carbon atoms per alkyl group, alkyl methacrylates having from one to eighteen carbon atoms per alkyl group, acrylonitrile, methacrylonitrile, isoprene and butadiene.

By suitable choice of monomer(s) it is possible to prepare pendant polymer chains having desired polymer properties. The pendant polymer chains may modify the ethylene polymer sufficiently to render it compatible or covulcanizable with a corresponding variety of polymers which are derived entirely, or predominantly, from the monomer(s) in the pendant chains. Graft polymers prepared by reacting one or more monomers with the metallated ethylene polymer typically have pendant polymer chains which comprise from about 10 to about 60, desirably from about 20 to about 40, percent by weight of the graft polymer.

When the pendant chains of the graft polymer have reached a desired molecular weight, the reaction may be terminated in the same way other anionic polymerizations are terminated. For example, an alcohol, an acid or both may be added to terminate polymerization. The polymer is then recovered by conventional means.

Organo-alkali metal compounds are known to react with a wide variety of reactive chemicals to produce new materials. The metallated polymers produced by the process of this invention react with the same types of reactive chemicals. Five typical reactions are described in succeeding paragraphs.

The metallated polymers can be reacted with carbon dioxide. The reaction product is then neutralized with a mineral acid to produce a carboxylated polymer. The degree of carboxylation is dependent upon the amount of metallation.

The metallated polymers can be reacted with alkylene oxides to produce an intermediate. The intermediate is terminated with a compound having a reactive hydrogen to yield hydroxy-functionalized compounds.

The metallated polymer can be used to initiate polymerization of dienes and certain vinylic compounds. Graft polymers can thus be prepared by adding alkali metal polymerizable monomers to the metallated polymer.

Block copolymers which cannot be produced by any more usual means can be prepared conveniently by using the metallated polymer as a starting material. A suitable co-reactant is a polymer or polymer segment with a group which reacts with the alkali metal atoms of the metallated polymer.

Although this disclosure describes metallation and subsequent reaction or functionalization of ethylene polymers in detail, similar results are obtained with other crystalline olefin polymers having varying degrees of unsaturation.

The following examples are for purposes of illustration only and are not to be viewed as limiting the present invention. All parts and percentages are on a weight basis unless otherwise indicated. Examples are indicated in Arabic numerals while comparative examples are indicated by capital alphabetic letters.

Metallation Apparatus

One apparatus, hereinafter "500 Milliliter Reactor", was set up in a dry box under a gaseous nitrogen atmosphere. The apparatus was assembled from glassware which had been washed and then dried for at least four hours at a temperature of about 120° Centigrade. The reaction vessel was a 500 milliliter capacity Tall Form TM beaker commercially available from Corning Glass Works. Solutions added to the vessel were agitated using a variable speed, motor-driven, stainless steel stirrer. The stirrer motor had an operating range of 40–315 revolutions per minute (from about 4.2 to about 33 radians per second).

A second apparatus, hereinafter "Three Liter Reactor", was set up and assembled in a manner similar to that used in setting up the 500 Milliliter Reactor. The reactor vessel was a 3000 milliliter glass reaction kettle. A high torque electric stirrer connected to a stainless steel anchor stirrer was used to agitate reactor vessel contents. The stirrer was fitted through one of three necks in the reactor vessel lid. A rubber septum was fitted over a second neck. A water cooled condenser connected to a nitrogen source and an atmosphereic vent with bubbler was fitted to the third neck.

Determining Extent of Metallation

Direct measurement of lithium metal content of a metallated polymer is generally recognized as difficult, if not impossible. Accordingly, a number of indirect techniques are used. One technique, described and used herein, involves carbonation of the metallated polymer with pure carbon dioxide to produce a derivative polymer which can be isolated and titrated as a carboxylic acid. Another technique, also described and used herein, involves reacting the metallated polymer with chlorotrimethylsilane and thereafter determining bound silicon content.

Example 1—Metallation of Ethylene-Diene Copolymer With Cyclohexane as the Solvent Using the 500 Milliliter Reactor described herein, ten grams of an ethylene-diene copolymer were refluxed in 300 milliliters of cyclohexane for ten minutes and then cooled to ambient temperature. Cyclohexane has a boiling point of about 78° C. The copolymer had a nominal 1,4-hexadiene content of 2.5 percent, a heat of fusion of 35.79 calories per gram, an annealed density of between about 0.945 and 0.950 grams per cubic centimeter, a nominal melting point in air of about 130° C., a melt index of 2.5 decigrams per minute, a bulk density of 18.6 pounds per cubic foot (pcf) (297.94 kilograms per cubic meter (kcm)), and a number average molecular weight of 13,090. A sufficient amount of cyclohexane was added to bring the volume back to 300 milliliters. The solution was stirred, cooled to, and maintained at, a constant temperature of 30° Centigrade throughout metallation. Metallating reagents were added to the solution in the order stated as follows: (a) 1.0 milliliters (6.65 millimoles) of TMEDA; (b) 2.8 milliliters (3.35 millimoles) of 1.2 molar potassium-tertamyloxide; and (c) 1.3 milliliters (3.35 millimoles) of 2.6 molar n-butyllithium.

One hour after addition of the metallating reagents, 3.0 milliliters of tetrahydrofuran were added to the solution. A silicon-tagged polymer solution was prepared by adding 2.3 milliliters (9.12 millimoles) of 3.94 molar chlorotrimethylsilane (diluted in tetrahydrofuran) to the solution after adding the tetrahydrofuran thereto.

Twenty milliliters of acidified propanol were added to the silicon-tagged polymer solution to terminate reaction thereof. The tagged polymer was then separated from the solution, washed first with propanol and then with water, separated by filtration and dried overnight in a vacuum oven at a temperature of 60° Centigrade.

The dried polymer was compression molded into thin film samples using a heated hydraulic press equipped with a six and one-half inch (16.51 centimeter) diameter ram. A sample of the polymer was pressed between two fluorinated ethylene-propylene polymer film sheets without a frame or chase. The press was commercially available from Pasadena Hydraulics Incorporated. The polymer sample and the film sheets were placed in the press and preheated to a temperature of about 150° to 190° Centigrade for a period of two minutes. The ram was then activated to place a total of 25,000 kilograms force upon the polymer sample. The force was sufficient to form a film sheet having a thickness of from about 1.5 to about 3 mils (0.00381 to about 0.00762 millimeters). The thickness was generally about 2 mils (0.00508 millimeters). The press was then cooled to ambient temperatures after which the ram was deactivated and the film samples were removed.

The thin film samples were analyzed for silicon atom content using an infrared spectrophotometer commercially available under the trade designation Model 283 from Perkin Elmer Corporation. A twelve minute scan time over a range of from about 4000 to about 200 reciprocal centimeters (cm$^{-1}$) was used for each sample. The intensity of the peak at 850 cm$^{-1}$, which represented the Si-CH$_3$ stretch, was used in determining extent of metallation (metallation efficiency) or the percentage of total available double bonds that were metallated. Metallation efficiency was calculated using absolute calibration of the formula y=1.86x, wherein y=moles per liter of silicon and x=absorbence at 850 cm$^{-1}$ per 0.001 inch of thickness. Metallation Efficiency was calculated to be 12.8 percent. The polymer had a bulk density of 13.6 pcf (217.85 kcm).

Example 2—Metallation of Ethylene-Diene Copolymer With Heptane as the Solvent With four exceptions, the procedure of Example 1 was duplicated. One exception was the substitution of heptane for cyclohexane. A second exception was an increased reflux temperature because heptane boils at a higher temperature than cyclohexane. A third exception was based upon visual observation of the slurry of polymer particles. With each of the solvents, the polymer particles appeared to swell, or increase in size, while being refluxed and to decrease somewhat in size with cooling. Heptane provided the greatest amount of swelling retention. A visual observation of the slurry after the solution was cooled to ambient temperature disclosed that 60 milliliters (ml) of the slurry volume consisted of polymer solids. A fourth exception was the use of acetone rather than water as a second wash solution. Metallation Efficiency was calculated to be 23.5 percent.

Examples 3–5 and Comparative Example A—Metallation of Ethylene-Diene Copolymer With a Blend of Isooctanes as the Solvent The procedure of Example 1 was modified to evaluate the effect of temperature upon metallation of the ethylene-nonconjugated diene copolymer. An isoparaffinic hydrocarbon fraction (hereinafter "i.h.f.") with a narrow boiling range of 116°–134° C. was used as a solvent. The fraction was commercially available from Exxon Company, U.S.A. under the trade designation ISOPAR ® E. Swelling temperature, metallation efficiency, product powder bulk density and approximate volume of solids after cooling, but prior to metallation, are shown in Table I. Examples 1 and 2 are also shown in Table I for ease of comparison.

TABLE I

| THREE COMPONENT METALLATION OF ETHYLENE-DIENE COPOLYMERS | | | | | | |
|---|---|---|---|---|---|---|
| Example Comparative Example | Solvent | Temperature °C. | Metallation Efficiency % | Product Powder Bulk Density (pcf/kcm) | Approx Volume Solids (ml) | Remarks |
| 1 | cyclohexane | 81 | 12.8 | 13.6/217.8 | — | |
| 2 | heptane | 98 | 23.5 | — | 60 | |
| 3 | i.h.f. | 80 | 19.7 | — | — | |
| 4 | i.h.f. | 100 | 21.4 | 4.95/79.3 | 70 | Temporary exotherm to 122° C. followed by cooling to 100° C. |
| 5 | i.h.f. | 122 | 57.9 | 5/80.1 | 100 | |
| A | i.h.f. | 25 | 12.2 | 18.2/291.5 | 25 | |

— not determined

The data presented in the table demonstrate that a crystalline ethylene/nonconjugated diene copolymer can be metallated. The data also show that the extent of metallation increases and the powder bulk density decreases with increasing temperature. The highest metallation efficiency (57.9 percent) is obtained when the polymer is heated to 122° C., a temperature near the copolymer's crystalline melting point, prior to metallation. Heating to such a high temperature, even momentarily as in Example 4, is enough to substantially reduce polymer powder bulk density and increase apparent solids volume. A comparison of Examples 4 and 5 indicates that more than momentary heating is needed to attain optimum metallation efficiency and, consequently, improved results in grafting reactions. Similar results are obtained with other metallating reagents, solvents and ethylene copolymers, all of which are defined herein.

Example 6—Grafting Polystyrene onto Ethylene-Diene Copolymer

The procedure used in Example 1 was modified in two aspects. First, the copolymer was initially heated to reflux in heptane then cooled to ambient temperature. The copolymer was separated from the solvent, dispersed in cyclohexane, separated a second time, and finally dispersed a second time in cyclohexane. Second, metallation was continued for 50 minutes, rather than one hour, after which three milliliters of tetrahydrofuran and then 5.5 milliliters (5 grams) of styrene monomer were added. The temperature increased from 30° Centigrade to 33° Centigrade during reaction of the styrene.

Polymerization of styrene monomer was terminated by addition of dry ice. The graft polymer was separated from the solvent, washed twice with acetone, twice with n-propanol, separated and dried. The dried graft polymer was pressed into a film using the procedure of Example 1. Analysis of the film by infrared spectroscopy provided a calculated polystyrene content of 10.3 percent.

Example 6, clearly shows that grafting of polystyrene onto an ethylene-diene copolymer is possible. Optimization with styrene and other reagents as well as other metallating reagents and ethylene copolymers, all of which are defined herein, is attainable without undue experimentation.

Example 7—Metallation of Ethylene/1,4-hexadiene Copolymer and Grafting of Styrene Onto the Metallated Copolymer Using the Three Liter Reactor, one hundred grams of an ethylene/diene copolymer and one gram (five millimoles) of potassium fenchylate were slurried in two liters of heptane and heated to 93° Centigrade with a heating mantle. The heating mantle was them removed to allow air cooling of the reactor vessel and its contents. The copolymer had a nominal 1,4-hexadiene content of 3.5 percent, an annealed density of 0.9458 grams per cubic centimeter, a melt index of 2.7 decigrams per minute and a bulk density of 16.4 pcf (262.7 kcm).

After the slurry had cooled to 88° Centigrade, 4.1 milliliters of a 2.6 molar solution of n-butyllithium in hexane were added to the slurry. Within one minute, a slight yellow tint was observed in the slurry. About five minutes later, the slurry had cooled to 78° Centigrade and was tan in color.

Fifty-eight minutes after addition of the n-butyllithium solution, stirring was stopped to allow the solids to settle before removing the heptane to within 1.5 inches (3.81 centimeters) above the settled solids. Cyclohexane was added, with stirring, to the admixture. Stirring was then stopped and liquid was decanted off the settled solids to within two inches (5.08 centimeters) above the solids. Cyclohexane was added again to bring the total volume of reactor contents to about 1.9 liters. The reactor contents were at a temperature of 30° Centigrade. Over a three minute interval, 110 milliliters (100 grams) of styrene monomer were added with stirring to the contents.

The reactor contents were stirred and allowed to react for a period of 55 minutes before the reaction was terminated by adding three milliliters of n-propyl alcohol. The admixture which had turned deep red following addition of the styrene monomer became nearly white following addition of the n-propyl alcohol. The reactor contents were then poured into two liters of n-propyl alcohol. The polymer solids were removed by filtration, washed with hexane, filtered a second time, dried in an oven and pressed into thin films using the procedures outlined in Example 1.

The thin films were analyzed for polystyrene incorporation using the same infrared spectrophotometer as in Example 1. Two polystyrene bands, 1601 cm$^{-1}$ and 1948 cm$^{-1}$, were chosen for calibration in a relatively interference-free region. The two bands were of different intensity so that low level amounts (<20%) could be determined with the 1601 cm$^{-1}$ band and larger amounts could be determined with the 1948 cm$^{-1}$ band. Standards were made by physically blending polystyrene homopolymer (molecular weight of 100,000) with an ethylene/1,4-hexadiene copolymer (2.4% diene content and a melt index of 2.7 decigrams per minute). The polystyrene extinction coefficients were, in moles/(cm$^3$)(cm path), $2.2\times10^4$ (1948 cm$^{-1}$) and $0.45\times10^4$ (1601 cm$^{-1}$). The graft polymer had a polystyrene content of 41.8 percent by weight of polymer. The remaining styrene was assumed to be lost as unreacted monomer.

Example 8—Metallation of Ethylene/1,4-Hexadiene Copolymer and Grafting of Styrene onto the Metallated Copolymer Using the same apparatus as in Example 7 and a slight modification of the procedure of Example 7, a different ethylene/1,4-hexadiene copolymer was metallated and thereafter grafted with styrene monomer. The copolymer had a nominal 1,4-hexadiene content of 2.4 percent and a melt index of 0.4 decigrams per minute.

Polymerization of the styrene monomer was allowed to continue for one hour rather than 55 minutes as in Example 7. Product recovery was changed from the procedure of Example 7 by adding about one liter of n-propyl alcohol to the reactor contents after terminating polymerization with one milliliter of n-propyl alcohol. Most of the n-propyl alcohol was decanted from the solids. An additional liter of n-propyl alcohol was added to the reactor vessel contents. After decanting most of the added n-propyl alcohol from the reactor contents, the contents were recovered and pressed into thin films as in Example 7. The graft polymer had a polystyrene content of 38.2 percent by weight of polymer.

Examples 7 and 8 illustrate a number of points. First, two-component metallation provides satisfactory results. Second, reasonably high levels of styrene grafting are possible. As noted following Example 6, optimization with styrene and other reagents as well as other metallating reagents and ethylene polymers is attainable without undue experimentation. Third, metallation of a crystalline polymer at a temperature of about 88° Centigrade following heating to a higher temperature produces desirable results.

Examples 9–11 and Comparative Example B- Metallation of Ethylene/1,4-Hexadiene Copolymers at Various Temperatures and Subsequent Reaction With Carbon Dioxide Using the 500 Milliliter Reactor, modified by replacing the vessel with a 500 milliliter Fleaker TM commercially available from Corning Glass Works, five gram portions of an ethylene/1,4-hexadiene copolymer and an amount of potassium tert-butoxide were slurried in four different solvents and thereafter heated, with stirring, to the reflux temperature of the solvent. The polymer had a nominal 1,4-hexadiene content of 4.6 percent by weight of polymer, an annealed density of 0.9464 grams per cubic centimeter and a melt index of 1.8 decigrams per minute. The solvent, the amount of solvent in milliliters (mls), the reflux temperature of the solvent in °Centigrade (°C.) and the amount of potassium tert-butoxide are all listed in Table II. After about five minutes at the reflux temperature, an amount (see, Table II) of 2.6 molar n-butyl lithium was added to the reactor contents. Heating was then discontinued and the contents were allowed to cool, with stirring, to room temperature. When the isoparraffinic fraction (i.h.f.) was used as the solvent, the slurry became transparent and slightly viscous at a temperature of about 110°. Following addition of the n-butyl lithium solution, the contents of the reactor vessel, which appeared to be a solution, turned dark brown. Upon cooling with stirring, a dark brown slurry was formed. In the case of the other solvents, particle integrity was never lost and the slurry became dark brown following addition of the n-butyl lithium solution.

After the reactor contents had cooled to room temperature, they were transferred to a 400 milliliter Parr hydrogenation bottle. The bottle was stoppered and carbon dioxide, at a pressure of 40 pounds per square inch gauge (275.8 kilopascals), was added thereto. The bottle was then shaken for a period of from about fifteen to thirty minutes. While being shaken, the polymer slurry rapidly became green and then blue in color. The bottle was then vented and its contents were filtered, washed with n-propanol and refiltered to give a light yellow powder. The powder was slurried in a mixture of n-propanol and dilute aqueous HCl (2-3 molar) for no more than five minutes to acidify carboxylate anions formed during reaction of the slurry with carbon dioxide. The solids were then filtered, washed with n-propanol and refiltered to give a pale white to yellow powder which was dried in a vacuum oven at a temperature of 50° Centigrade.

The dried powder was formed into thin films using the procedures detailed in Example 1. The films were analyzed via infrared spectroscopy for degree of metallation by observing the intensity of the band at 1710 cm$^{-1}$ which represented the carbonyl stretch. The absorbance at 1710 cm$^{-1}$, the film thickness and the carbonyl molarity in the film are all listed in Table II. Using 0.530 to represent the maximum achievable carbonyl molarity (assuming 100 percent conversion of double bonds to carbonyl), a value for metallation efficiency was calculated. The calculated value is shown in Table II.

between the metallated polymer and carbon dioxide. Second, it shows that the degree of metallation is definitely temperature-dependent. That is, improved results are obtained with increasing temperature, at least to the point where decomposition of the alkyl lithium compound interferes with metallation efficiency. As shown in Example 7, the lowering of efficiency can be avoided by cooling the slurry prior to adding the alkyl lithium compound thereto. Third, it shows the viability of the two-component metallation system. That is, the tertiary diamine is not needed to achieve enhanced metallation. Further improvements are obtained if the tertiary diamine is used in conjunction with the potassium alkoxide. Similar results are obtained with other crystalline ethylene polymers, lithium alkyls, activating compounds, anionically polymerizable monomers and electrophilic compounds, all of which are specified herein.

Example 12—Metallation of Ethylene/1-Octene/1,9-Decadiene Terpolymer and Subsequent Grafting of Styrene onto the Metallated Terpolymer An ethylene/octene/1,9-decadiene polymer having a melt index of 0.75 decigrams per minute, a density of 0.8897 grams per cubic centimeter, and a diene content of 5.15 percent by weight of polymer was used as a base polymer for metallation and subsequent grafting. The polymer was available in the form of a solid block of material. The polymer was believed to be crystalline based upon its solubility in an alkane solvent as hereinafter detailed. The heat of fusion, melting point and relative crystallinity were not determined.

In an initial attempt to convert the solid into an expanded particulate form, one half of a gram of polymer shavings were placed in 100 milliliters of heptane and refluxed at 98° Centigrade, with stirring, for a period of five hours. A visual inspection disclosed minimal dissolution of the polymer as evidenced by a slight cloudiness of the originally clear heptane. In a second attempt, one gram of polymer shavings were placed in 100 milliliters of the same isoparaffinic hydrocarbon fraction as used in Examples 3–5 and refluxed at 122° Centigrade, with stirring, for a period of one hour. A visual inspection showed that the polymer shavings had dissolved. Two additional grams of polymer shavings were added to the solvent and refluxed two hours. The additional polymer also dissolved. Upon cooling to ambient temperature, polymer particles came out of solution.

The 500 Milliliter Reactor described herein was converted to a 1200 Milliliter Reactor by replacing the 500 milliliter vessel with a 1200 milliliter Fleaker ™ commercially available from Corning Glass Works. Nine hundred milliliters of the isoparaffinic hydrocarbon fraction were added to the reactor, heated with a heat-

TABLE II

| | TWO-COMPONENT METALLATION AND REACTION OF METALLATED POLYMER WITH CARBON DIOXIDE | | | | | | | | |
|---|---|---|---|---|---|---|---|---|---|
| Example/ Comparative Example | Solvent | | Reflux | Potassium Tert- | 2.6 M n-butyl | | Film | Carbonyl Molarity | Percent Unsat- |
| | Type | Amount (mls) | Temp. °C. | Butoxide grams | lithium ml | Absorbance 1710 cm$^{-1}$ | Thickness mils | in Film | uration Metallated |
| B | hexane | 200 | 69 | 0.314 | 2 | 0.088 | 4.0 | 0.014 | 2.5 |
| 9 | cyclohexane | 150 | 81 | 0.315 | 2 | 0.43 | 5.0 | 0.062 | 11.7 |
| 10 | heptane | 160 | 98 | 0.314 | 2 | 1.110 | 4.0 | 0.203 | 38.3 |
| 11 | i.h.f. | 200 | 122 | 0.314 | 4 | 0.580 | 3.9 | 0.107 | 20.3 |

The data presented in Table II illustrate several points. First, it demonstrates the viability of the reaction ing mantle and stirred. After ten minutes of heating, 2.5 grams of the polymer were added in the form of small chunks over a period of about five minutes to the heated solvent. The temperature of the solvent was 110° Centigrade during addition of the polymer. Heating was continued for an additional ten minutes until the temperature reached 113° Centigrade. With the heating mantle turned off and an insulating jacket in place around the reactor vessel, stirring was continued for 30 minutes at which time the temperature was 112° Centigrade. A visual inspection of the contents showed that some of the polymer had not dissolved. Heating was then reinitiated to allow the solvent and polymer to reflux at a temperature of 119° Centigrade for a period of 35 minutes. A visual inspection showed that all of the polymer had dissolved. The heating mantle and the insulation were then removed from the reactor vessel.

After the contents of the reactor vessel had cooled to 97° Centigrade, 2.6 milliliters of 1.8 molar potassium tert-amyloxide were added to the vessel. Polymer solids had come out of solution as discrete, white particles thereby forming a slurry prior to addition of the potassium compound. The slurry appeared to turn slightly yellow following addition of the potassium compound. At a temperature of 89° Centigrade, 2.9 milliliters of 2.6 molar n-butyllithium were added to the vessel to initiate metallation of the polymer. The slurry turned from light brown immediately following addition of the n-butyllithium to dark brown within two minutes.

The slurry was allowed to cool to a temperature of 40° Centigrade over an interval of 70 minutes. The slurry was then transferred to a clean 1200 milliliter Fleaker TM where it occupied 800 milliliters of volume. The reactor vessel had a thin film at the bottom thereof, presumably due to overheating of vessel walls. One hundred milliliters of fresh solvent were used to rinse the reactor vessel and then added to the slurry to provide a total volume of 900 milliliters. The thin film remained in the bottom of the reactor vessel. The slurry had the appearance of a dark brown slush of slightly swollen but definitive particles.

Ten minutes after the slurry was transferred from the reactor vessel, the temperature of the slurry was 34° Centigrade. One hundred milliliters of distilled tetrahydrofuran were added to the slurry. This was followed immediately by addition of 18.3 milliliters of styrene monomer over a period of 13 minutes. Upon completion of the monomer addition, the slurry had reached a temperature of 37° Centigrade and had become dark reddish-brown in color. Seventy minutes later, 2.0 milliliters of n-propanol were added to the slurry to terminate reaction of the styrene monomer. The slurry, or admixture, became pale yellow following addition of the n-propanol.

The admixture was poured into 2500 milliliters of acetone to separate any styrene homopolymer which might have been prepared from the graft polymer. The graft polymer was presumed to be insoluble because the terpolymer was insoluble in acetone. The solids were separated by filtration, washed first with n-propanol, then with hexane and dried overnight in a vacuum oven. The dried solids weighed 17.9 grams and contained 24.3 percent by weight of styrene as determined by infrared spectroscopy.

Evaporation of liquids from the filtrate was accomplished in three stages. First, gaseous nitrogen was bubbled through the filtrate for several hours (overnight). Second, the filtrate was exposed to open air drying without the gaseous nitrogen for several hours. Finally, the filtrate was placed in a vacuum oven for several hours. Residual solids weighed 21.3 grams and had a styrene content of 46.0 percent by weight as determined by infrared spectroscopy. Fifty-four percent by weight of the residual solids were therefore based upon the terpolymer.

Example 12 illustrates several points. First, metallation and subsequent grafting of a particulate, crystalline terpolymer is possible as evidenced by the styrene content of the polymer solids recovered by filtration. Second, the graft polymer differs physically, at least in terms of solubility in acetone, from the starting terpolymer as evidenced by the content of terpolymer in the filtrate. Similar results are obtained with other crystalline ethylene terpolymers reagents and metallating reagents, all of which are described herein.

What is claimed is:

1. A process for metallating a particulate, crystalline ethylene polymer having polymerized therein, bsed upon polymer weight, from about 90 to about 99.5 percent ethylene and from about 0.5 to about 10 percent nonconjugated diene which comprises:
   a. heating an admixture of the particulate polymer and a nonreactive, saturated organic hydrocarbon solvent, the admixture having an original settling volume, to a temperature and for a period of time sufficient to swell the polymer particles and provide the polymer, after being cooled to ambient temperature, with an expanded settling volume which is greater than the original settling volume; and
   b. adding at least one lithium alkyl compound and at least one activating compound to the heated admixture of swollen polymer particles.

2. the process of claim 1 further comprising an intermediate step of cooling the heated admixture to a temperature suitable for metallating the swollen polymer particles.

3. The process of claim 1 wherein the nonconjugated diene is selected from the group consisting of straight chain or branched chain diolefins having from five to twenty carbon atoms; cyclic diolefins having from five to twenty carbon atoms; and bicyclic diolefins having from ten to thirty carbon atoms.

4. The process of claim 1 wherein the nonconjugated diene is selected from the group consisting of 2-methyl-1,5-hexadiene, 3,3-dimethyl-1,5-hexadiene, 1,6-heptadiene, 1,7-octadiene, 1,8-nonadiene, 1,9-decadiene, 1,19-eicosadiene, 1,4-hexadiene, 1,4-heptadiene, 1,5-heptadiene, cyclohexadiene, cycloheptadiene, cyclooctadiene, dicyclopentadiene, ethylidene-norbornene and norbornadiene.

5. The process of claim 1 wherein the nonconjugated diene is 1,4-hexadiene.

6. The process of claim 1 wherein the ethylene polymer has a density of from about 0.92 to about 0.96 grams pe cubic centimeter.

7. The process of claim 1 wherein the ethylene polymer also has polymerized therein at least one 1-olefin monomer.

8. The process of claim 7 wherein the 1-olefin monomer is selected from the group consisting of 1-butene, 1-hexene and 1-octene.

9. The process of claim 7 wherein the ethylene polymer forms a slurry, rather than a solution, when admixed with an alkane solvent at a temperature of 80° Centigrade or less.

10. The process of claim 1 wherein the temperature to which the admixture is heated is greater than about 80°

Centigrade but less than the polymer's peak melting temperature as determined by differential scanning calorimetry.

11. The process of claim 1 wherein the admixture is heated to a temperature within a range of from about 80° to about 122° Centigrade.

12. The process of claim 1 wherein the admixture is heated to a temperature within a range of from about 90° to about 110° Centigrade.

13. The process of claim 1 wherein the admixture is heated at a temperature and for a period of time sufficient to destroy individual polymer particle integrity and thereafter cooled, with agitation, at a rate sufficient to reconstitute the polymer in particulate form prior to addition of the lithium alkyl compound.

14. The process of claim 13 wherein the temperature to which the admixture is heated is from about 100° to about 155° Centigrade.

15. The process of claim 2 wherein the temperature suitable for metallation is less than about 100° Centigrade.

16. The process of claim 2 wherein the temperature suitable for metallation is from about 20° to about 100° Centigrade.

17. The process of claim 1 wherein the activating compound is a potassium alkoxide selected from the group consisting of alkyl and aryl alkoxides having up to 20 carbon atoms with potassium being bound to a hetero atom.

18. The process of claim 17 wherein the potassium alkoxide is selected from the group consisting of potassium methoxide, potassium ethoxide, potassium fenchylate, potassium- tert-butoxide, potassium phenoxide, potassium-tert-amyloxide and potassium naphthoxide.

19. The process of claim 1 wherein the lithium alkyl compound is represented by the general formula $RLi_x$ wherein R is an alkyl radical containing up to 20 carbon atoms, an aromatic radical having from 6 to 20 carbon atoms, a saturated cyclic hydrocarbon radical having from 5 to 7 carbon atoms, a mono-unsaturated cyclic hydrocarbon radical having from 5 to 7 carbon atoms or an unconjugated, unsaturated aliphatic radical of 1 to 20 carbon atoms.

20. The process of claim 1 wherein the lithium alkyl compound is a branched lithium alkyl wherein the alkyl has five or more carbon atoms.

21. The process of claim 20 wherein the lithium alkyl compound is selected from the group consisting of 3,3-dimethylbutyllithium, 3,3-dimethylpentyllithium, menthyllithium and neopentyllithium.

22. The process of claim 1 wherein the nonpolar hydrocarbon solvent has from about 5 to about 10 carbon atoms per molecule.

23. The process of claim 1 wherein the nonpolar hydrocarbon solvent is hexane or cyclohexane.

24. A metallated, crystalline ethylene polymer having polymerized therein, based upon polymer weight, from about 90 to about 99.5 percent ethylene and from about 0.5 to about 10 percent nonconjugated diene prepared by a process which comprises:
   a. heating an admixture of a particulate, crystalline ethylene polymer and a nonreactive, saturated, nonpolar organic hydrocarbon solvent, the admixture having an original settling volume, to a temperature and for a period of time sufficient to swell the polymer particles and provide the polymer, after being cooled to ambient temperature, with an expanded settling volume which is greater than the original settling volume; and
   b. adding at least one lithium alkyl compound and at least one activating compound to the heated admixture of swollen polymer particles.

25. A process for metallating a particulate, crystalline ethylene polymer which comprises:
   a. heating an admixture of the particulate polymer, at least one activating compound and a nonreactive, saturated organic hydrocarbon solvent, the admixture having an original settling volume, to a temperature and for a period of time sufficient to provide the polymer, after being cooled to ambient temperature, with an expanded settling volume which is greater than the original settling volume; and
   b. adding at least one lithium alkyl compound to the heated admixture of swollen polymer particles.

26. The process of claim 7 wherein the ethylene polymer has a heat of fusion of greater than about five calories per gram and a relative crystallinity of greater than about ten percent.

* * * * *